United States Patent [19]

Abidor

[11] Patent Number: 4,829,982
[45] Date of Patent: May 16, 1989

[54] TRUNNION

[75] Inventor: Aleksander Abidor, Mississauga, Canada

[73] Assignee: Garland Commercial Ranges Limited, Mississauga, Canada

[21] Appl. No.: 119,902

[22] Filed: Nov. 10, 1987

Related U.S. Application Data

[62] Division of Ser. No. 31,552, Mar. 30, 1987, abandoned.

[51] Int. Cl.⁴ .............................. A47J 27/06
[52] U.S. Cl. .................................. 126/349; 126/345; 251/311; 222/166; 285/131
[58] Field of Search ............. 251/311; 222/146.4, 222/604, 605, 164, 166; 159/37, DIG. 32, 16.3; 126/345, 348, 349; 285/131, 136; 137/560; 165/86

[56] References Cited

U.S. PATENT DOCUMENTS

| 1,215,298 | 2/1917 | Melvin | 222/166 |
| 1,993,779 | 3/1935 | French et al. | 126/349 |
| 2,217,750 | 10/1940 | Hockenstrom | 126/38 |
| 2,411,006 | 11/1946 | Sharp | 126/378 |
| 3,047,015 | 7/1962 | Buck | 251/311 X |
| 3,829,103 | 8/1934 | Sussman | 285/136 X |

FOREIGN PATENT DOCUMENTS

| 694947 | 9/1964 | Canada | 126/349 UX |
| 1154272 | 9/1983 | Canada | 126/349 UX |
| 22759 | 1/1918 | Denmark | 126/349 X |
| 202498 | 1/1939 | Switzerland | 126/378 |
| 222541 | 10/1942 | Switzerland | 126/349 |

Primary Examiner—Albert J. Makay
Assistant Examiner—Carl D. Price
Attorney, Agent, or Firm—Eugene J. A. Gierczak

[57] ABSTRACT

A steam kettle adapted to rotate about a horizontal axis of rotation between a vertically upright position and a tilted position comprising a support; a kettle having an open top; a stationary trunnion housing connected to said support; a trunnion shaft received within said trunnion housing and arranged for rotation about a horizontal axis whereby said kettle is solely supported by said trunnion shaft adapted for rotation about said horizontal axis between said vertical upright position and said tilted position; and securing structure adapted to receive releasable retaining structure for releasably retaining said trunnion shaft with said cylindrical hole of said trunnion housing.

9 Claims, 3 Drawing Sheets

TRUNNION

This is a division of application Ser. No. 031,552, filed Mar. 30, 1987, now abandoned.

FIELD OF INVENTION

This invention relates to a trunnion housing and a trunnion shaft and more particularly to a steam tilting kettle supported by a single trunnion assembly.

BACKGROUND TO THE INVENTION

Steam kettles are being used on a commercial basis to heat relatively large quantities of foods such as soup, sauces or the like. Such kettles or vessels have an opening at the top thereof for receiving such foods and are heated in the kettle to the appropriate cooking temperature. Once the food is cooked the tilting kettle is adapted to be swivelled about a pivot point so as to pour out the contents therein into an appropriate container. Such tilting kettle or vessels are adapted to swivel about trunnion assemblies which include a trunnion shaft and trunnion housing.

Canadian Pat. No. 1,154,272 relates to a vapour jacket cooking vessel having tubular evaporators with a closed end and an open end where the open end is affixed to the vapour jacket so that the working fluid flows into and floods the evaporator and functions as the working fluid therein.

Furthermore, Canadian Pat. No. 694,947 relates to an elevating mechanism used in association with the kettle.

U.S. Pat. No. 1,993,779 discloses a heat transfer medium passing through two trunnions.

U.S. Pat. No. 2,411,006 discloses two trunnions each of which is longitudinally bored to form a steam conduit leading into the chamber and a valve which is provided to control the delivery thereto.

The steam jacketed tilting kettles heretofore have been supported and adapted for rotation about an axis passing through two trunnions connected at oposite sides of the kettle. The use of two trunnions for steam jacketed tilting kettles presents relatively complicated structure as well as causing difficulties in lining up the two trunnions (located in bearings) after welding.

It is an object of this invention to construct an efficient steam tilting kettle and particularly a steam tilting kettle which is supported for rotation about a single trunnion assembly.

FEATURES OF THE INVENTION

The broadest aspect of this invention relates to:

a steam kettle adapted to rotate about a horizontal axis of rotation between a vertically upright position and a tilted position comprising; a support; a kettle having an open top and presenting an inner and outer shell defining a heat exchange chamber there between; said outer shell having a steam inlet and a steam condensate outlet, both said inlet and outlet communicating with said heat exchange chamber; a stationary trunnion housing connected to said support, said trunnion housing including a cylindrical hole extending through said housing along said horizontal axis; a trunnion shaft received within said cylindrical hole of said trunnion housing and arrange for rotation about said horizontal axis, said trunnion shaft connected at one axial end of said shaft to said outer shell of said kettle so as to cover said steam inlet and steam condensate outlet, whereby said kettle is solely supported by said trunnion shaft adapted for rotation about said horizontal axis within said cylindrical hole of said stationary trunnion housing between said vertical upright position and said tilted position; said trunnion housing including a first and second aperture for communicating steam and steam condensate to said cylindrical hole; said trunnion shaft including, a first conduit therein and arranged for communicating with said steam inlet and said first aperture so as to direct steam into said heat exchange chamber when said kettle is in said vertically upright position, and to substantially prevent the communication of steam into said heat exchange chamber in said tilted position, a second conduit therein and arranged for communicating with said steam condensate outlet and said second aperture so as to exhaust said steam condensate from said heat exchange chamber through said steam condensate outlet when said kettle is in said vertically upright position, and to substantially prevent communication of steam condensate from said heat exchange chamber through said steam condensate outlet when said kettle is in said tilted position; securing structure adapted to receive releasable retaining structure for releasably retaining said trunnion shaft with said cylindrical hole of said trunnion housing.

DRAWINGS

These and other objects and features will now be described in association with the following drawings.

DESCRIPTION OF THE INVENTION

Like parts have been given identical numbers throughout the figures.

Figures 1, 2:
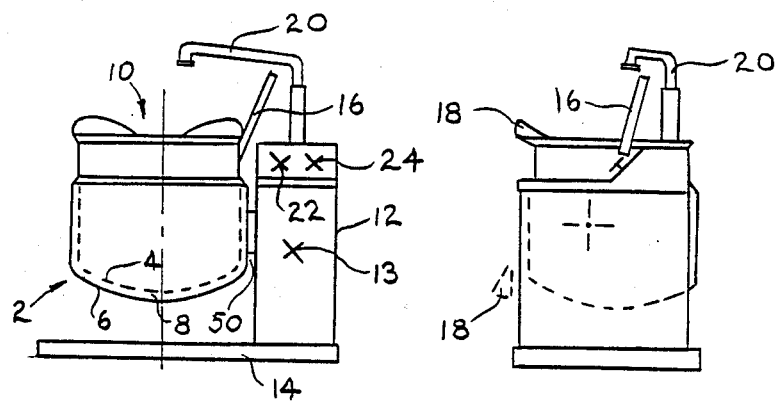
FIG. 1 is a front elevational view of said steam tilting kettle.
FIG. 2 is a side elevational view of said kettle.

FIG. 1 illustrates the steam kettle sometimes referred to as a steam jacketed tilting kettle, which consists of inner shell 4 and outer shell 6 which is generally made of stainless steel. Inner shell 4 and outer shell 6 define a heat exchange chamber 8 therebetween.

The steam kettle 2 is supported by single trunnion assembly 50 which is connected to an upright console 12 which is connected at the bottom end thereof to a horizontal base 14.

The steam kettle 2 is adopted to receive food substance though the open top end 10 thereof. The food substance is cooked in the kettle 2 by transfer of heat energy from the steam in the heat exchange chamber which shall be more fully described herein.

Once the food substance is cooked such substance may be poured out of the kettle 2 by means of grasping the tilt handle 16 and pulling forward causing the kettle 2 to pivot about the single trunnion assembly 50 to a position marked by the phantom lines in FIG. 2, thereby causing the food substance to pour out over the lip 18 of kettle 2.

Once the food substance is poured out of kettle 2, the inside of kettle 2 may be cleaned by means of introducing hot or cold water through the swivel nozzle 20 by activation of hot or cold water valve 22 and 24 respectively.

By utilizing a single trunnion assembly 50, as shall be more fully described herein, one may construct a steam kettle having a relatively simplified construction, which is aesthetically pleasing to the eye, as well as producing a kettle which is relatively easier to clean thereunder without the obstruction of legs or the like.

Figure 3:
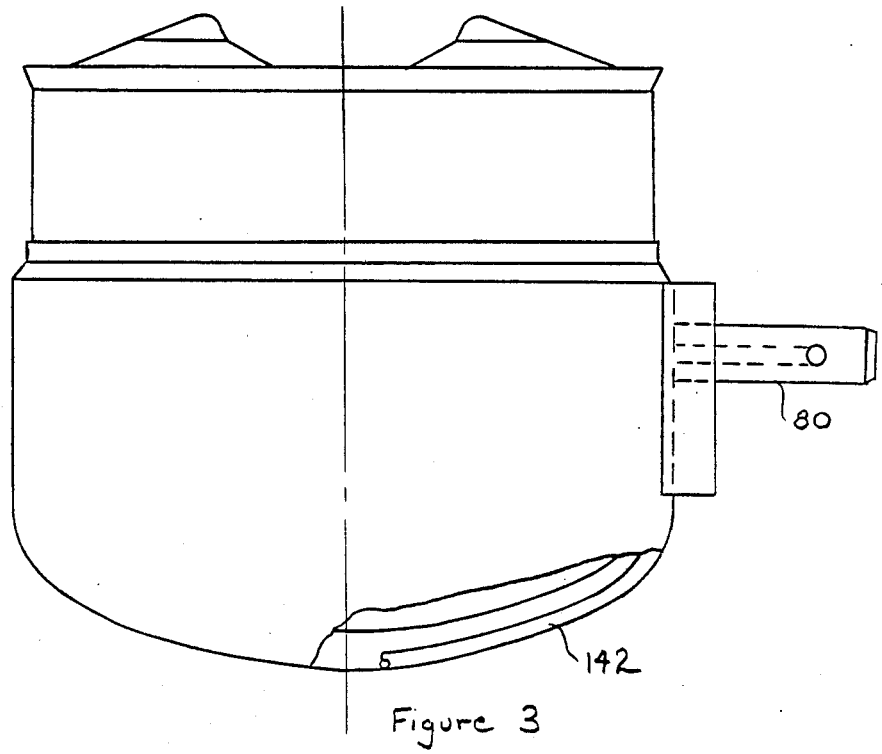
FIG. 3 is a partial cross-sectional view of said trunnion shaft.
Figure 4:
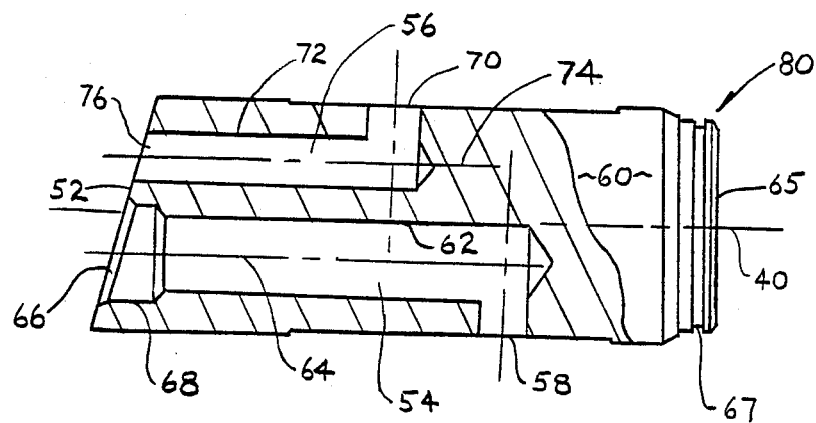
FIG. 4 is a partial cross-sectional view of said trunnion housing.
Figure 5:
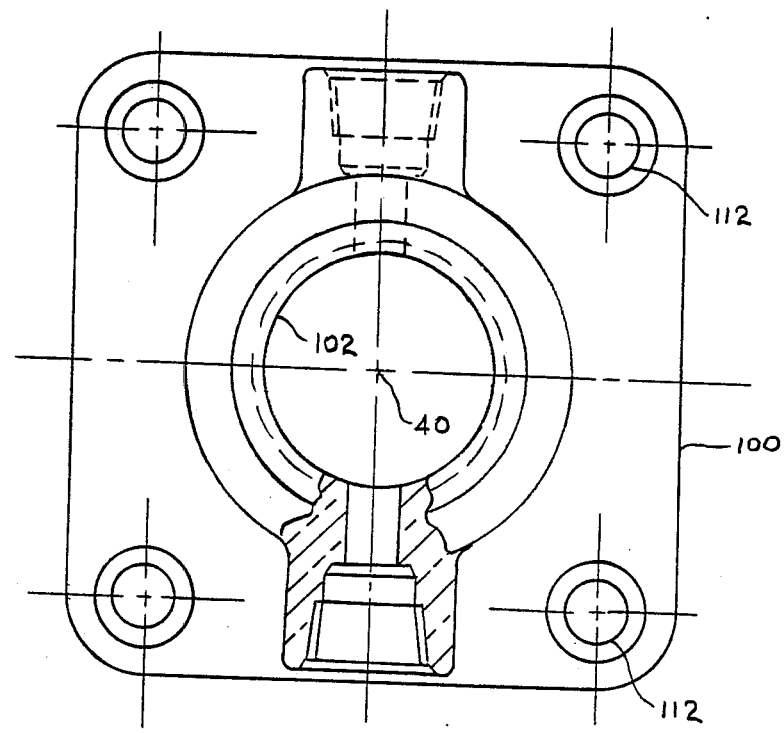
FIG. 5 is a top plan view of said trunnion housing.
Figure 6:
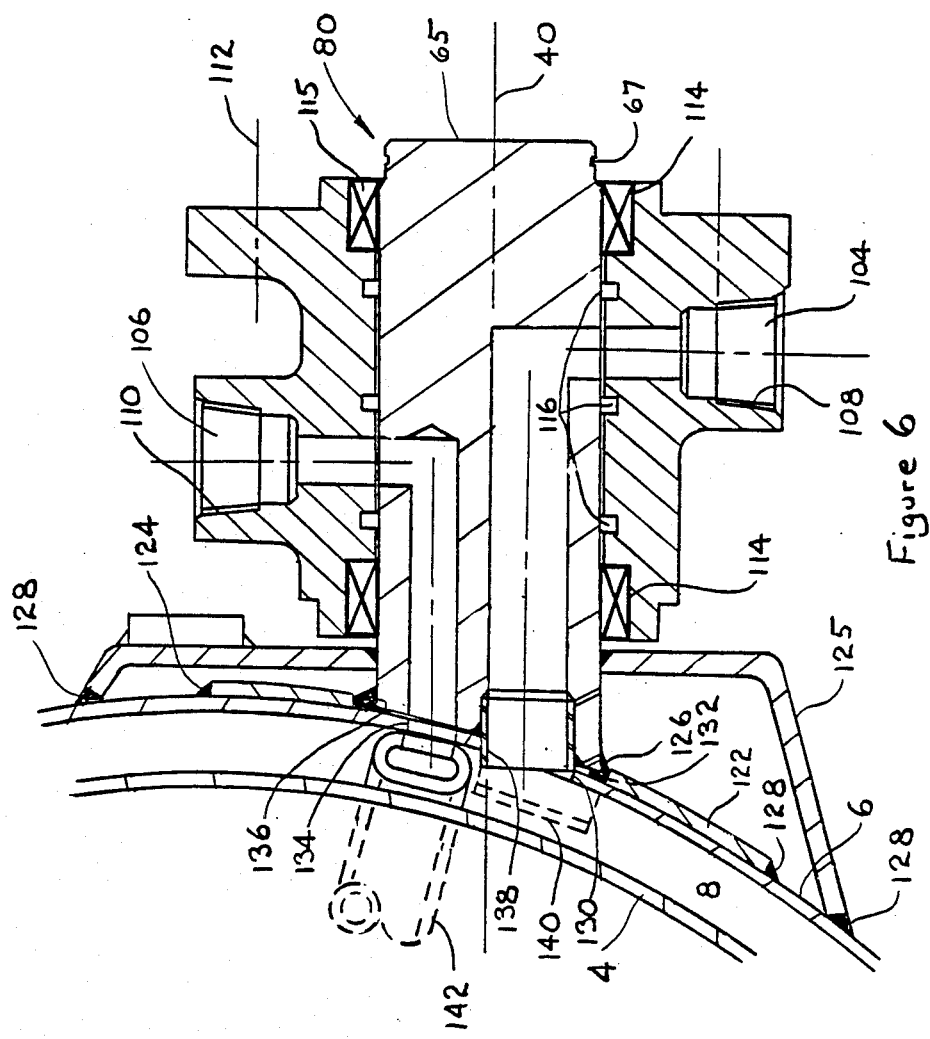
FIG. 6 is a cross-sectional view of said trunnion assembly.

The trunnion assembly 50 comprises generally a trunnion shaft 80 as illustrated in FIG. 3 and 4 and trunnion housing 100 as illustrated in FIGS. 5 and 6.

The trunnion shaft 80 is fabricated from steel and is adapted to be connected to the outer shell 6 of kettle 2 at one end 52 thereof by means of welding and shall be described herein, or by other suitable means.

The trunnion shaft 80 is adapted for rotation about an axis of rotation 40. Trunnion shaft 80 presents a first conduit 54 for introducing steam through said shaft 50 and out through one end 52 of such shaft 50. The trunnion shaft 80 also includes a second conduit 56 for exhausting steam condensate from said one end 52 of said shaft 50 through such shaft 80 and out therefrom.

As best illustrated in FIG. 4, first conduit 54 and second conduit 56 are disposed relatively parallel to one another and to the axis of rotation 40.

The first conduit 54 generally consists of a first conduit inlet 58 presented in the cylindrical surface 60 of the trunnion shaft 80. Such inlet 58 merges with a first cylindrical hole 62 having a first axis 64 disposed in said shaft 80 which is generally parallel to the axis of rotation 40.

The first cylindrical hole 62 is produced by drilling a hole from one end 52 of the shaft 80 to a region near the other end of the shaft 65. This produces a conduit outlet 66 at the one end 52 of shaft 80. The first conduit inlet 58 is produced by drilling a hole through surface 60 so as to intersect and merge with the first cylindrical hole 62.

First conduit 54 is adapted to introduce steam through the first conduit inlet 58, first cylindrical hole 62 and out the first conduit outlet 66.

The first conduit outlet 66 also presents an enlarged opening 68 which is adapted to receive a steam inlet tube 138 as shall be described more fully herein.

The shaft 80 also includes the second conduit 56 which generally consists of a second conduit outlet 70 presented in the cylindrical surface 60 of shaft 80. Such outlet 70 merges with a second cylindrical hole 72 having a second axis 74 disposed of in the shaft 80 which is generally parallel to the axis of rotation 40.

The second cylindrical hole 72 is produced by drilling a hole from the one end 52 of shaft 80 to a region between ends 52 and 65 of shaft 80. This produces a second conduit inlet 76 at the one end 52 of shaft 80. The second conduit outlet 70 is produced by drilling a hole through the surface 60 so as to intersect, merge and communicate with the second cylindrical hole 72.

Second conduit 56 is adapted to exhaust or vent steam condensate from said one end 52 of shaft 80 through the second conduit inlet 76, second cylindrical hold 72, and second conduit outlet 70.

As can be best seen from FIG. 4, first conduit inlet 58 and second conduit 70 are axially spaced along the shaft surface 60 and disposed 180 degrees from each other.

The one end 52 of shaft 80 is disposed at an acute angle of 75 degrees from the axis of rotation 40 so as to assist in welding said one end 52 to the circular girth of outer shell 6 of kettle 2.

First cylindrical hole 62 is larger in diameter than second cylindrical hole 72.

FIGS. 5 and 6 generally illustrate trunnion housing 100 which comprises a cylindrical hole 102 adapted to receive trunnion shaft 80 for relative rotation therebetween about an axis of rotation 40. Trunnion shaft 80 includes an annular groove 67 in the region of the other end 65 which is adapted to receive a "C" clip (not shown) so as to removably fixedly retain trunnion shaft 80 within hole 102.

Trunnion housing 100 includes a first aperture 104 adapted to communication with hole 102 and first conduit opening 58 to direct steam therethrough; and a second aperture 106 adapted to communicate with hole 102 and second conduit outlet 70 so as to exhaust steam condensate therefrom.

First aperture 104 includes threads 108 for connecting to a steam pipe and valve (not shown) for introducing steam under pressure. Second aperture 106 includes threads 110 for connecting to a steam condensate exhaust pipe and valve (not shown).

Trunnion housing 100 also includes holes 112 which are adapted to receive bolts for anchoring the trunnion housing 100 to the interior of support or console 12 so as to present the axis of rotation 40 in a horizontal position.

Trunnion housing 100 also includes enlarged diametral ends 114 adapted to retain bushings 115 for rotational contact with the trunnion shaft 80 so as to minimize the frictional drag therebetween.

Hole 102 of trunnion housing 100 also includes three spaced angular groves 116 adapted to receive and retain O-rings for sealing contact with shaft 80 thereby minimizing any leakage of steam between the first and second conduits 54 and 56 respectively as well as to the outside environment. Furthermore the trunnion shaft 80 is supported by bushings 115 while the O-rings are adapted to perform a sealing function. The trunnion shaft 80 is not supported by the O-rings.

As can be seen from FIG. 6 one end 52 of trunnion shaft 80 is connected to outer shell 6 by means of welding. A shell reinforcement plate 122 is also welded to the outer shell 6 at 124 as well as the one end 52 of trunnion shaft 80 at 126. Furthermore, a body reinforcement plate 125 is welded to outer shell 6 at 128 and to trunnion shaft 80. Shell reinforcement plate 122 and body reinforcement plate 125 is utilized to rigidify the connection of trunnion shaft 80 to outer shell 6.

Outer shell 6 and shell reinforcement plate 122 present holes 130 and 132 respectively which communicate with first conduit outlet 66 and present holes 134 and 136 respectively which communicate with second conduit inlet 76.

Enlarged opening 68 is adapted to receive steam inlet tube 138 as illustrated in FIG. 6. Steam inlet tube 138 is adapted to have a tight fit between the inside diameter of first conduit outlet 66 and the outside diameter of steam inlet tube 138. The steam inlet tube 138 is welded to trunnion shaft 80 as illustrated in FIG. 6.

Heat exchange chamber 8 presents a deflector plate 140 which is welded to the inside surface of outer shell 6 in the region of first conduit outlet 66 so as to deflect steam downwardly into the heat exchange chamber 8.

A condensate return tube 142 is also provided which is connected to the inside surface of outer shell 6 and is disposed between second conduit inlet 76 and the bottom of kettle 2. The condensate return tube 142 is adapted to permit the steam condensate which tends to fall to the bottom of the kettle 2 to be exhausted through condensate return tube 142, holes 134, 136, second conduit inlet 76, second cylindrical hole 56, and second conduit outlet 70 and second aperture 104 and out therethrough to suitable piping which is not shown.

The operation of the tilting kettle shall now be described by reference to FIG. 6.

The tilting kettle 2 is filled with food stuff and may be filled with hot or cold water as required by turning hot and cold valves 22 and 24. The steam control valve 13 is then turned so as to introduce steam into the first aperture 104, first conduit inlet 58, first cylindrical hole 62, first conduit outlet 66, and heat exchange chamber 8 so as to heat the inner wall of shell 4 with steam. Heat energy is then transferred to the food to heat same, and the steam condensate is exhausted since first aperture 104 and first conduit 54 line up when the kettle 2 is in the vertical or operative position, and second conduit 56 and second aperture 106 line up when kettle 2 is in the vertical or operative position.

Once the food is cooked to the desired temperature such food may then be removed as earlier described by tilting handle 16 forward and pouring out the food over lip 18. When the kettle 2 is displaced from the vertical or operative position, to a tilted or inoperative position, first aperture 104 and first conduit 54, as well as second aperture 106 and second conduit 56 no longer register or communicate with one another and any steam condensate flow would be drastically reduced.

Steam control valve 13 may be turned off once the food is cooked before the kettle is tilted.

A second kettle 2 may be attached to the right hand side of console 12 by a single trunnion assembly 50 so as to present twin tilting kettles.

The kettle 2 operates efficiently between 5 and 50 pounds per square inch of pressure while a 20 pound per square inch operating pressure is recommended. A pressure reducing valve may be installed on the steam supply line if the maximum 50 pounds per square inch is exceeded.

Although the preferred embodiment as well as the operation and use have been specifically described in relation to the drawings, it shall be understood that variations in the preferred embodiment could easily be achieved by a man skilled in the art without departing from the spirit of the invention. Accordingly, the invention should not be understood to be limited to the exact form revealed by the drawings.

The embodiments of the invention in which an exclusive property or priviledge is claimed are defined as follows:

1. In a steam kettle adapted to rotate about a horizontal axis of rotation between a vertically upright position and a tilted position comprising:
 (a) a support;
 (b) a kettle having an open top and presenting an inner and outer shell defining a heat exchange chamber therebetween;
 (c) said outer shell having a steam inlet and a steam condensate outlet, both said inlet and outlet communicating with said heat exchange chamber;
 (d) a stationary trunnion housing connected to said support, said trunnion housing including a cylindrical hole extending through said housing along said horizontal axis;
 (e) a trunnion shaft received within said cylindrical hole of said trunnion housing and arranged for rotation about said horizontal axis, said trunnion shaft connected at one axial end of said shaft to said outer shell of said kettle so as to cover said steam inlet and steam condensate outlet, whereby said kettle is solely supported by said trunnion shaft adapted for rotation about said horizontal axis within said cylindrical hole of said stationary trunnion housing between said vertical upright position and said tilted position;
 (f) said housing including a first and second aperture means for communicating steam and steam condensate to said cylindrical hole;
 (g) said trunnion shaft including:
  (i) a first conduit means therein and arranged for communicating with said steam inlet and said first aperture means so as to direct steam into said heat exchange chamber when said kettle is in said vertically upright position, and to substantially prevent the communication of steam into said heat exchange chamber in said tilted position;
  (ii) a second conduit means therein and arranged for communicating with said steam condensate outlet and said second aperture means so as to exhaust said steam condensate from said heat exchange chamber through said steam condensate outlet when said kettle is in said vertically upright position, and to substantially prevent the communication of steam condensate from said heat exchange chamber through said steam condensate outlet when said kettle is in said tilted position.
 (h) securing means adapted to receive releasable retaining means for releasably retaining said trunnion shaft with said cylindrical hole of said trunnion housing.

2. In a steam kettle as claimed in claim 1 including a condensate return tube disposed within said heat exchange chamber extending from said steam outlet to a region near a bottom of said kettle.

3. In a steam kettle as claimed in claim 2 including steam deflecting means disposed in said heat exchange chamber adjacent said steam inlet.

4. In a steam kettle as claimed in claim 2 wherein said first conduit means comprises a first conduit inlet presented in the surface of said trunnion shaft and adapted to communicate with said first aperture means of the trunnion housing, said first conduit inlet merging with a first cylindrical hole in said trunnion shaft and having a first axis disposed generally parallel to said access of rotation, said first cylindrical hole presenting a first conduit outlet at said one end of said shaft for communicating with said steam inlet.

5. A steam kettle as claimed in claim 4 wherein said second conduit means comprises a second conduit outlet presented in the surface of said trunnion shaft and adapted to communicate with said second aperture means of said trunnion housing, said second conduit outlet merging with a second cylindrical hole in said trunnion shaft and having a second axis disposed generally parallel to said access of rotation, said second cylindrical hole presenting a second conduit outlet at said one end of said shaft for communicating with said steam condensate outlet.

6. In a steam kettle as claimed in claim 5 wherein said first conduit inlet and said second conduit outlet are axially spaced along said trunnion shaft surface and disposed 180 degrees from each other.

7. In a steam kettle as claimed in claim 6 wherein said trunnion housing presents bushing means at both ends thereof for contact with said trunnion shaft.

8. In a steam kettle as claimed in claim 7 including gaskets means disposed between said trunnion housing and said trunnion shaft.

9. A kettle as claimed in claim 8 wherein said securing means is defined by an annualar groove said trunnion shaft.

* * * * *